United States Patent
Haran et al.

(10) Patent No.: US 8,731,117 B2
(45) Date of Patent: May 20, 2014

(54) METHOD AND SYSTEM FOR OFDM FRAME BOUNDARY DETECTION IN A VEHICULAR MULTIPATH CHANNEL

(75) Inventors: Onn Haran, Bnei Dror (IL); Hanoch Kremer, Harzelia (IL)

(73) Assignee: Autotalks Ltd., Kfar Netter (IL)

( * ) Notice: Subject to any disclaimer, the term of this patent is extended or adjusted under 35 U.S.C. 154(b) by 108 days.

(21) Appl. No.: 13/502,623

(22) PCT Filed: Sep. 22, 2010

(86) PCT No.: PCT/IB2010/054286
§ 371 (c)(1),
(2), (4) Date: Apr. 18, 2012

(87) PCT Pub. No.: WO2011/077270
PCT Pub. Date: Jun. 30, 2011

(65) Prior Publication Data
US 2012/0314754 A1      Dec. 13, 2012

Related U.S. Application Data

(60) Provisional application No. 61/289,402, filed on Dec. 23, 2009.

(51) Int. Cl.
*H03D 1/00*         (2006.01)
(52) U.S. Cl.
USPC ........... 375/343; 375/340; 375/316; 375/354; 370/203; 370/204; 370/206; 370/208

(58) Field of Classification Search
USPC .......... 375/343, 340, 316, 354; 370/203, 204, 370/206, 208
See application file for complete search history.

(56) References Cited

U.S. PATENT DOCUMENTS

| | | | |
|---|---|---|---|
| 2007/0047433 A1* | 3/2007 | Kao | .............................. 370/208 |
| 2008/0043858 A1 | 2/2008 | Lim et al. | |
| 2009/0213947 A1* | 8/2009 | Rao et al. | ....................... 375/260 |

OTHER PUBLICATIONS

T. M. Schimdl and D. C. Cox, "Robust frequency and timing synchronization for OFDM", IEEE Transactions on Communications, Dec. 1997, pp. 1613-1621, vol. 45.
J. Medbo and P. Schramm, "Channel models for HIPERLAN/2," ETSI/BRAN document No. 3ERI085B.
Hazy L. et al., "Synchronization of OFDM systems over frequency selective fading channels", Vehicular Technology Conference, IEEE 47th Phoenix, AZ, USA, May 1997.
PCT Search Report, Jan. 19, 2011.
PCT Written Opinion, Jun. 26, 2012.

* cited by examiner

*Primary Examiner* — Zewdu Kassa
(74) *Attorney, Agent, or Firm* — Menachem Nathan; Nathan & Associates Patent Agents Ltd.

(57) ABSTRACT

Embodiments of a method for OFDM frame boundary detection in a vehicular multipath channel include use of a maximal channel energy instead of a strongest path for detecting a frame boundary. A sample of OFDM data inputs is processed using long preamble local copy correlation and integration to obtain a channel energy which sums all paths of the multipath. A plurality of such channel energies obtained within a given time period are searched for a maximal channel energy, which, when found, is used to detect the frame boundary.

16 Claims, 12 Drawing Sheets

METHOD AND SYSTEM FOR OFDM FRAME BOUNDARY DETECTION IN A VEHICULAR MULTIPATH CHANNEL

CROSS REFERENCE TO RELATED APPLICATIONS

This application claims priority from U.S. Provisional Patent Application No. 61/289,402 titled "Method and apparatus for vehicle signal acquisition in vehicular multipath channel" and filed 23 Dec. 2009, which is incorporated herein by reference in its entirety.

FIELD AND BACKGROUND

Embodiments of the invention relate to vehicular communications employing orthogonal frequency-division multiplexing (OFDM). OFDM is known and widely used in fixed WLAN environments. A common acquisition method for OFDM in WLAN applications is described in T. M. Schimdl and D. C. Cox, "Robust frequency and timing synchronization for OFDM," IEEE Transactions on Communications, vol. 45, pp. 1613-1621, December 1997, (hereinafter the "SC method"). The acquisition enables detection of a frame boundary.

Typical WLAN environments addressed by the SC method include homes and offices, i.e. indoor, normally line-of-sight (LOS) environments. The SC method detects a frame boundary through use of short preamble (SP) delayed copy correlation (DCC) applied to OFDM data inputs received in a strongest (highest energy) path. The frame boundary detection is done before a long preamble (LP) period begins.

There is a growing interest in applying OFDM in vehicular communications, e.g. in vehicle-to-vehicle (V2V) communications. In contrast with indoor communications, OFDM signal acquisition in vehicular communications presents at least two major challenges: longer ranges and severe multipath effects in non-line-of-sight (NLOS) environments. These challenges are explained through examples described with reference to FIGS. 1-3.

FIG. 1 illustrates a common NLOS environment for V2V communication between two vehicles 100 and 104. A short (direct) path 106 passing through a building 102 has larger attenuation than a second (longer) path 108 which arrives at vehicle 104 later in time. FIG. 2 illustrates the received signal of the two paths. Path 106 has lower energy than path 108. The use of SP-DCC in the SC method would result in a maximal path energy value erroneously related to the strong (second) path. Consequently, a point 206 will be detected instead of a point 204 as a frame boundary. This will cause a Fast Fourier Transform (FFT) window 208 to be applied with an additional part of the next received symbol, S2(t+N), thereby causing Inter Symbol Interference (ISI) and hence Inter Carrier Interference (ICI). In other words, the SC method would fail in detecting the correct frame boundary, since it acquires the strongest (second) path and not the first (weaker) path. Modem performance will typically be degraded by several dBs when the wrong path is selected. Known variants of the SC method are based essentially on similar "strongest path" acquisition, and may fail in a similar way to detect a frame boundary correctly.

Another problem with the SC method lies in its reliance on SP. As implied by its name, SP is indeed short, only 0.8 μsec in a 20 MHz channel and 1.6 μsec in a 10 MHz channel. The power delay profile (PDP) of an outdoor channel may be close to, or even exceed, such values. In this case, reliable integration is impossible because the integration needs to be long enough to sum all channel path energies, but short enough to avoid confusion between repeated occurrences of SP replicas on the same path (which occur every SP length). FIG. 3 shows the PDP of channel HiperLan-E (defined in J. Medbo and P. Schramm, "Channel models for HIPERLAN/2," ETSI/BRAN document no. 3ERI085B). $|H|^2$ is the channel energy squared. It is seen that the path at 300 nsec is stronger than the direct (first) path at 0 nsec. The path at 150 nsec is also stronger than the path at Onsec (although weaker that that at 300 nsec). In outdoor communication channels, the discrepancy would be even greater.

There is therefore a need for, and it would be advantageous to have a method for OFDM frame boundary detection in a vehicular multipath channel which does not suffer from the disadvantages inherent in methods which have been developed for, and mainly applied in indoor environments.

SUMMARY

In embodiments of the invention, OFDM frame boundary detection in a vehicular multipath channel is improved significantly by using a maximal channel energy level ("energy level" referred to henceforth simply as "energy") instead of a strongest path (path with highest path energy) for detecting a frame boundary. The channel energy is obtained by performing long preamble local copy correlation (LP-LCC) on a plurality of OFDM data input signals sampled in a sampling period, which provides a LP-LCC result per sample, and by integration of a number of (current and previous) LP-LCC results using a sliding window. A plurality of channel energies, obtained from a number of samples in an acquisition (or "search") time period not longer than LP/2 is then searched for the maximal channel energy used to detect the frame boundary. The frame boundary detection is followed by channel equalization, performed on averaged LP replicas in the time-domain.

BRIEF DESCRIPTION OF THE DRAWINGS

Non-limiting embodiments of the invention are herein described, by way of example only, with reference to the accompanying drawings, wherein:

FIG. 4b shows details of steps in FIG. 4a;

DETAILED DESCRIPTION

In contrast with the SC method and its variants, the LCC is based on using the long preamble of a packet to perform cross correlation. As defined in the IEEE802.11 standard, LP is four times longer than SP. Further in contrast with the SC method and its variants, an embodiment of a method disclosed herein bases the acquisition of the OFDM signal and the resulting detection of a frame boundary on a maximal channel energy value and not necessarily on the strongest path energy.

Figure 1:
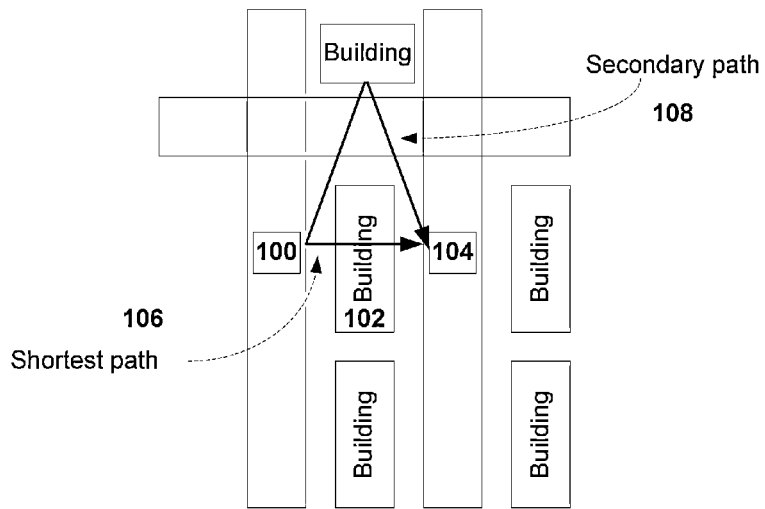
FIG. 1 illustrates a common NLOS environment for V2V communication between two vehicles.
Figure 2:
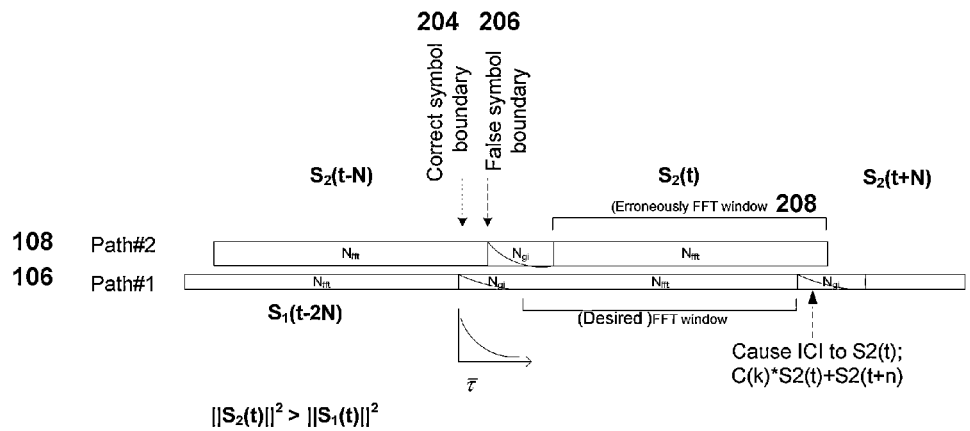
FIG. 2 illustrates the received signal with the two-path channel with reference to FIG. 1.
Figure 3:
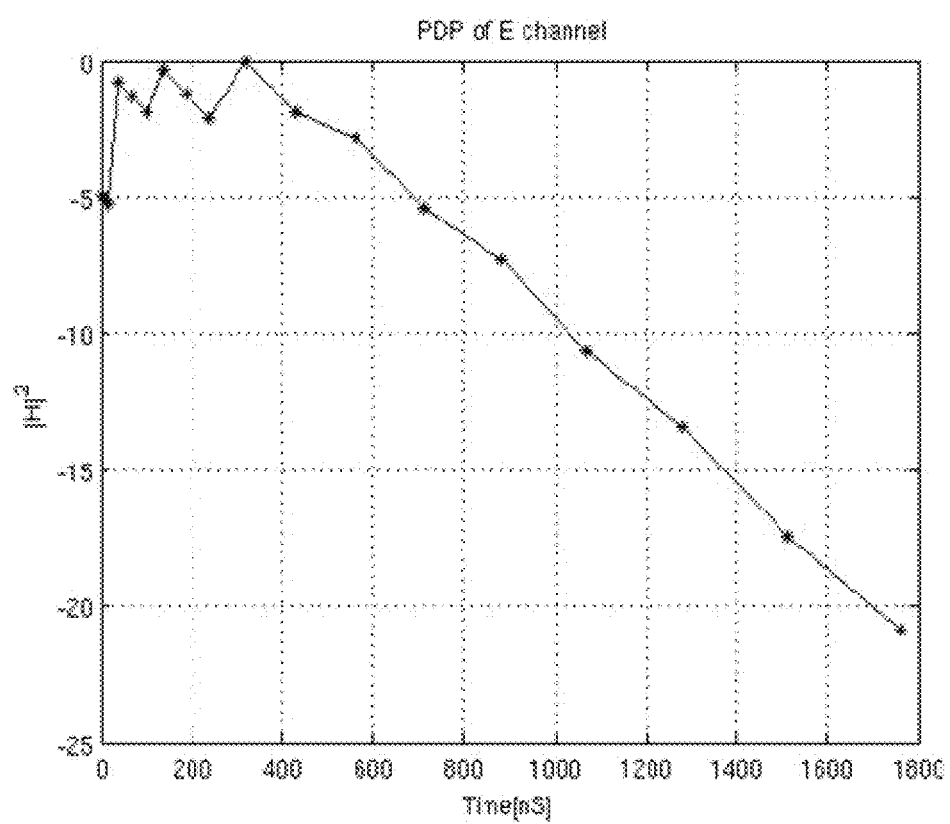
FIG. 3 shows the PDP of the HiperLan-E channel.
Figure 4A:
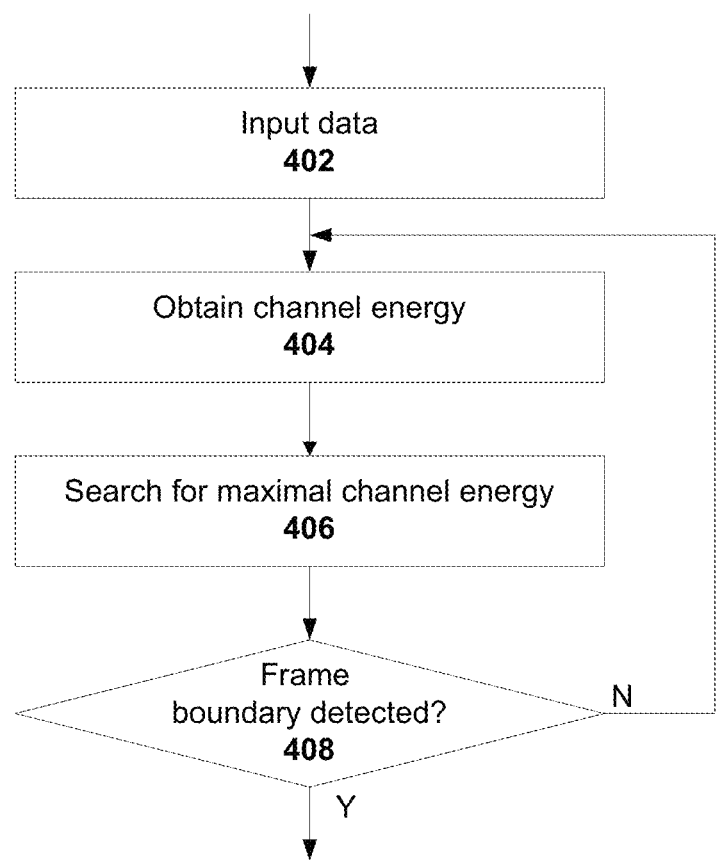
FIG. 4a shows steps of an embodiment of a method disclosed herein.

FIG. 4a shows steps of an embodiment of a method disclosed herein. In step 402, a sample including a plurality of complex OFDM data inputs is received at a receiver within a sampling period. Exemplarily, a sampling period may be 100 nsec or less. The data inputs are processed in step 404, the processing resulting in channel energy. The reception and processing are repeated on a number of samples to obtain a plurality of respective channel energies. The samples are acquired within an acquisition period related to a long preamble. According to the IEEE802.11p standard, LP is typically 16 μs. The acquisition period is normally shorter than half the LP. Exemplarily, the number of samples is between 10 and 15. The channel energies obtained within the acquisition period are searched for a maximum in step 406. The found maximal channel energy is used in step 408 to detect a frame boundary.

Figure 4B:
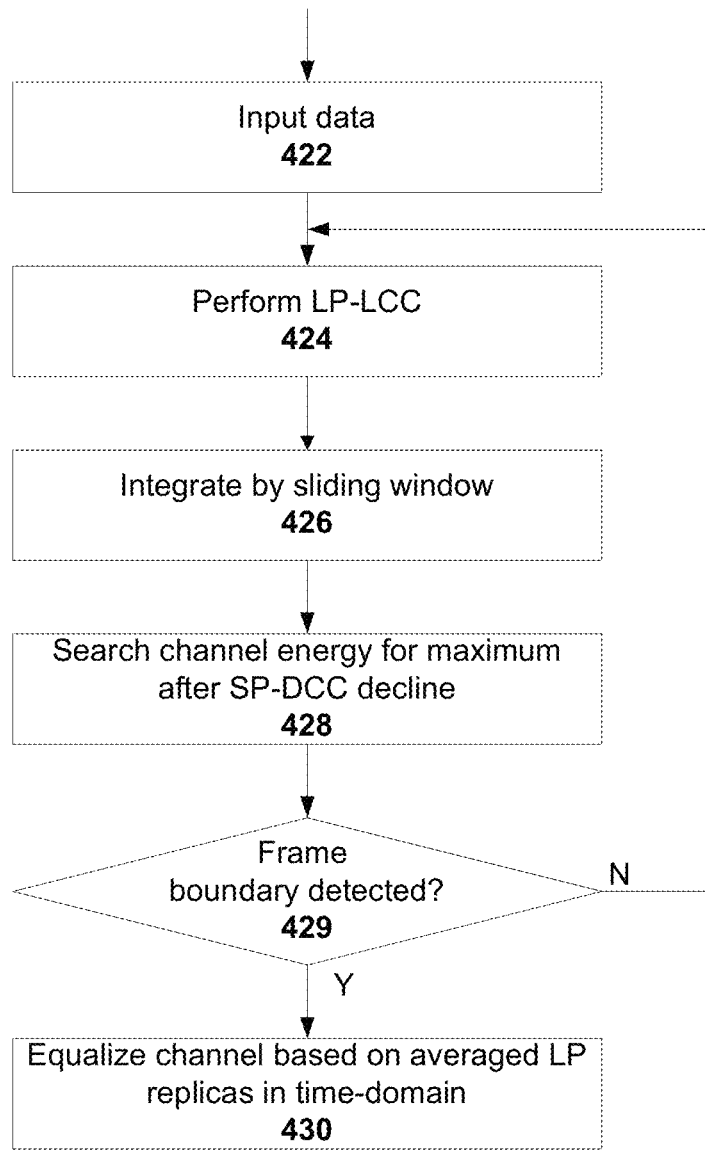

FIG. 4b show more details of the steps of the method embodiment of FIG. 4a. A sample of data inputs is obtained in step 422. The processing step 404 includes performing LP-LCC on the data inputs of the sample (424), which results in a current LP-LCC result. Each LP-LCC result represents the energy of a single path. The processing further includes integration of the current LP-LCC result plus a plurality (e.g. 10-15) of previous LP-LCC results by a sliding window (426), to provide channel energy instead of path energy. The LP-LCC and the integration are repeated for each sample, thereby yielding a plurality of channel energies. This is followed by the search for the maximal channel energy (428). In some embodiment, the search is done after an optional SP-DCC operation (see below) shows a decline in the SP-DCC result.

The SP-DCC at a length of 16 is performed on the same OFDM data inputs as in step 402. In an exemplary embodiment, it is performed as in the SC method. In an embodiment, the SP-DCC and LP-LCC operations are performed substantially in parallel, with the SP-DCC result validating the LP-LCC result. In an alternative embodiment, the two operations are not performed in parallel. A SP-DCC result obtained this way is not used to detect a frame boundary (as in the SC method), but just to validate that the LP-LCC is not running during the short preamble, thereby preventing false detections. Optionally, the incoming data input signals are also stored in a buffer (508 in FIG. 5) to allow making the frame boundary decision during half of the LP period. This is further in contrast with the SC method, in which the decision is made before the LP period begins. Finally, equalization of the channel based on averaged LP replicas is performed in the time-domain in step 430.

A typical WLAN equalization is based on Zero Forcing Least Squares. Mathematically, Channel=2*LP/(FFT(LP1)+FFT(LP2)), where "LP1" and "LP2" are the two replicas of LP. A method as shown in FIGS. 4a and 4b performs averaging in the time domain, and equalization is performed as: Channel=2*LP/FFT(LP1+LP2). Some of the actions mentioned above are now described in more detail.

Figure 5:
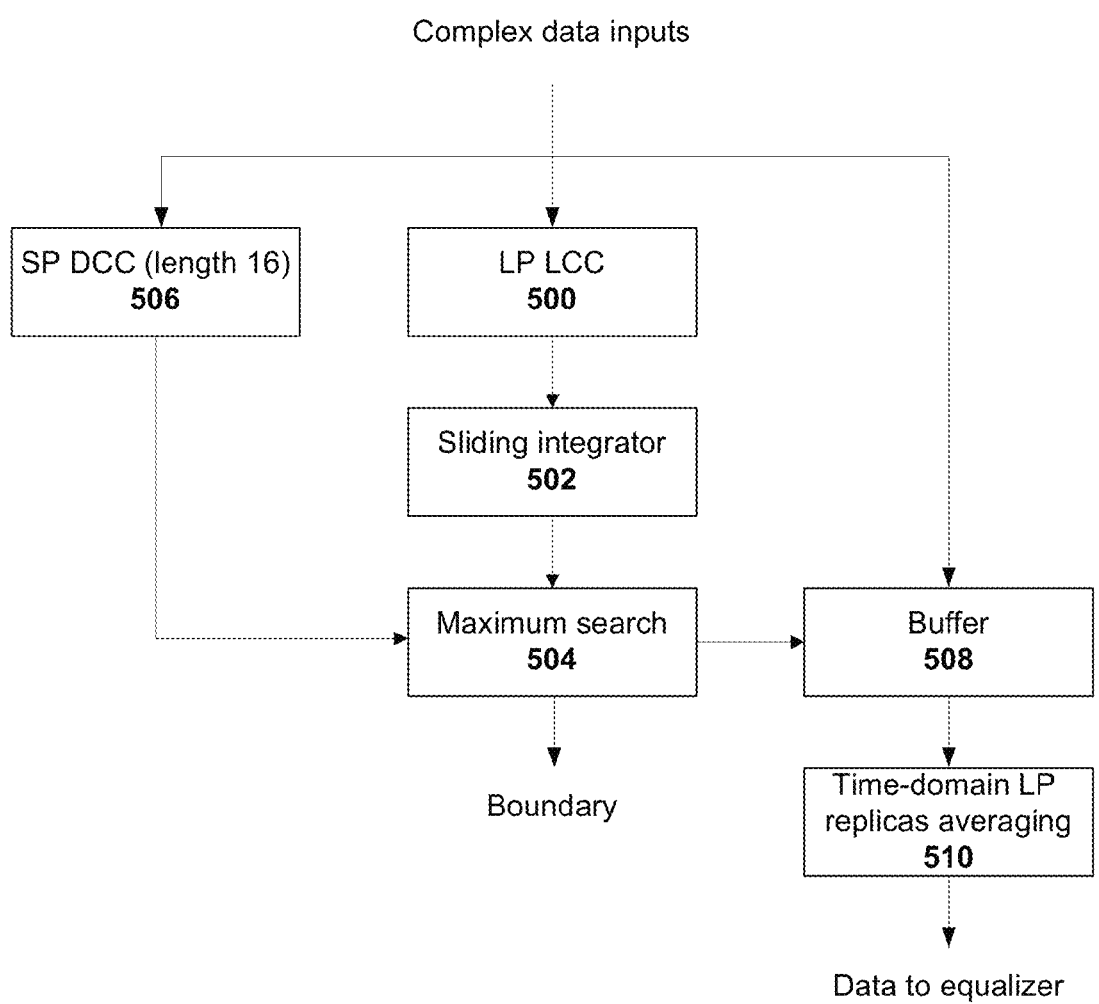
FIG. 5 is a block diagram illustrating schematically an embodiment of a system disclosed herein.

FIG. 5 is a block diagram illustrating schematically an embodiment of a system for OFDM frame boundary detection in a vehicular multipath channel disclosed herein. The system includes a LP-LCC module 500 for performing the LP-LCC operation; a sliding integrator module 502 for performing the integration; a maximum search module for performing the search for the maximal channel energy; a SP-DCC (with length 16) module 506 for performing the optional SP-DCC operation; buffer 508 for storing the incoming OFDM data signals; and a time-domain LP replica averaging module 510 for averaging the two LP replicas, with the average value forwarded to an equalizer (not shown). The modules are interconnected as shown.

LP-LCC Correlation

As mentioned above, the SP-DCC as applied by the SC method provides the channel structure, but the frame boundary detection may be wrong if the strongest path is selected. Embodiments disclosed herein use LP-LCC and additional integration to provide correct frame boundary detection. The correct frame boundary is obtained through the selection of maximal channel energy over a time interval (exemplarily up to LP/2) instead of selection of the position of the maximum cross-correlation value (strongest path). The maximal power selection is based on integration of channel energy, where all channel paths, including the first weak path, are within the integration period.

Figure 6:
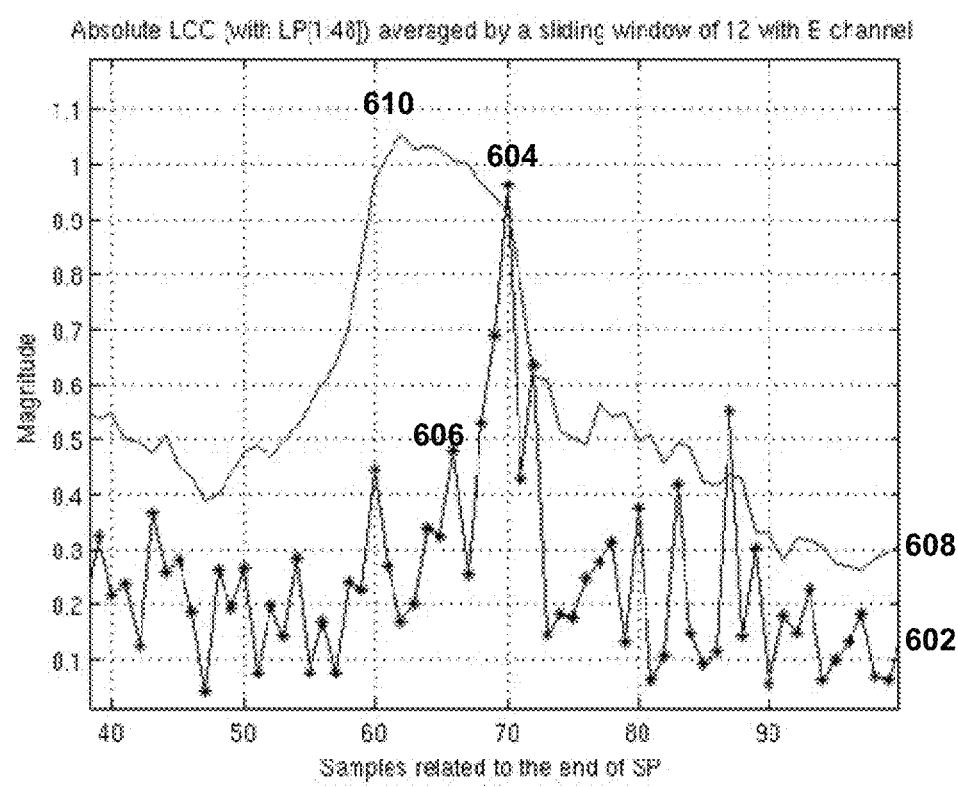
FIG. 6 illustrates an integration window over the LCC output with channel HiperLan-E @BW=20M.

FIG. 6 illustrates the results of an integration window over the LCC output with channel HiperLan-E @BW=20M. A LP-LCC result with a correlation length of 48 is marked by 602. A peak 604 indicates the strongest path, but not necessarily a first path (which is marked by 606). A LP-LCC integration result (value) is marked by 608, and reflects the channel PDP. The highest integrated value 610 indicates the optimal frame boundary point. The results in FIG. 6 prove that integration as taught herein can detect the first (and not the strongest) path.

Exemplary Implementation of the LP-LCC Module

Known implementations of LCC modules in hardware tend to be "brute force" type and tend to require a large gate count and a large memory. In order to reduce the HW implementation size, embodiments of systems disclosed herein use a LP-LCC calculation module which quantizes a reference signal to three values, −1, 0 and 1, where −⅓ and +⅓ are the decision points. In an embodiment, the quantization equation (Matlab style) is:

LpLcc_Q_1_3=((abs(real(norm_localcopy_LP)))
>⅓).*(2*(real(norm_localcopy_LP)>0)−1)+j*
(((abs(imag(norm_localcopy_LP)))>⅓).*(2*
(imag(norm_localcopy_LP)>0)−1))

The cross-correlation formulation is $C_{R,LP}(m) = \text{Conv}(R(n), LP(-n)^*)$ $$Lcc(m) = \left| \sum_{n=1}^{48} R(n+m) \cdot LP\_Q(n)^* \right|^2$$

where R(n) is the received complex signal in 10M samples/sec, LP_Q(n) is the quantized LP series (−/+1,0) and (*) is the complex conjugate.

Exemplary Implementation of the Sliding Integrator

In an embodiment, the sliding integrator uses a non-flat integrating window. In a LOS environment with a single path, integration with a flat window will result in a rectangle. In such an environment, it is impossible to find a channel energy maximum. In order to maintain correctness for the single path LOS case but to avoid biasing the NLOS (multiple paths with the first one not being the strongest), an additional gain component (described and shown in FIG. 7(a)) is added to a single integration window element to detect the cross-correlation path. The equivalent integral is a rectangle window+impulse response.

Figure 7:
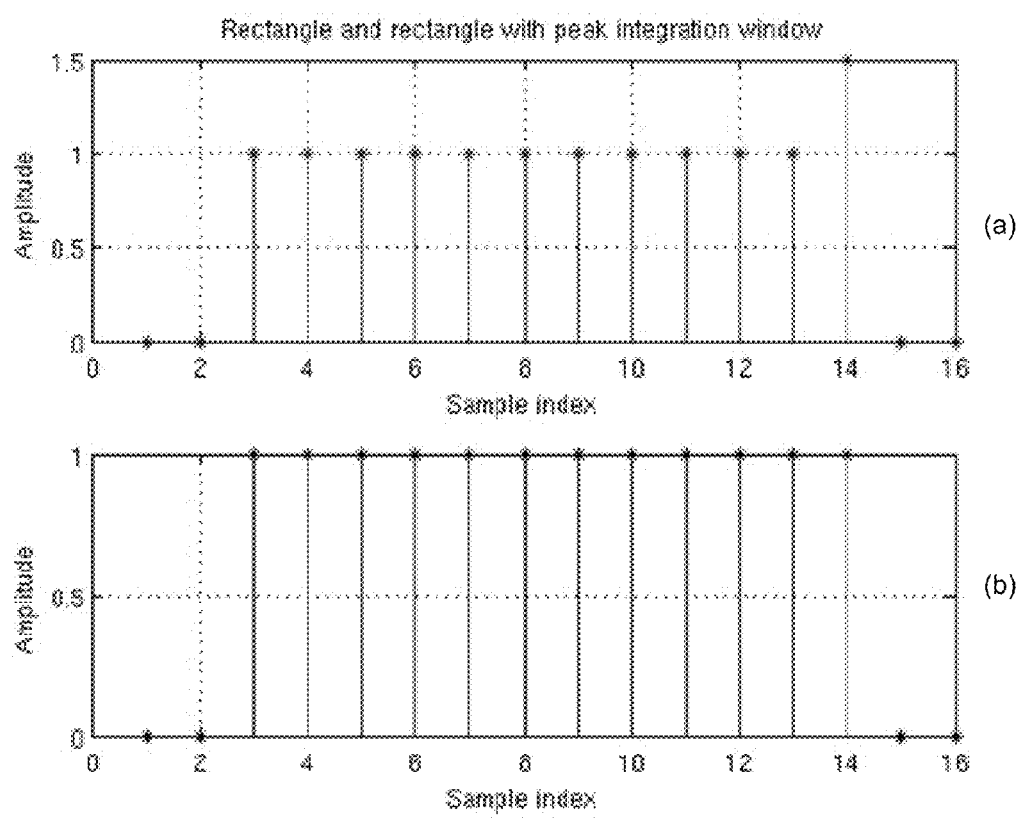
FIG. 7a illustrates a conventional rectangular window.
FIG. 7b illustrates a rectangular window with peak integration.

FIG. 7 illustrates in (a) a conventional rectangular window and in (b) a rectangular window with peak integration. In FIG. 7(a), the weighted level of a sample 14 is higher than that of all other samples. FIG. 7(b) also shows that the weight (value multiplied by each integrated element) applied to each sample in the integration process as well as all levels are equal.

Figure 8:
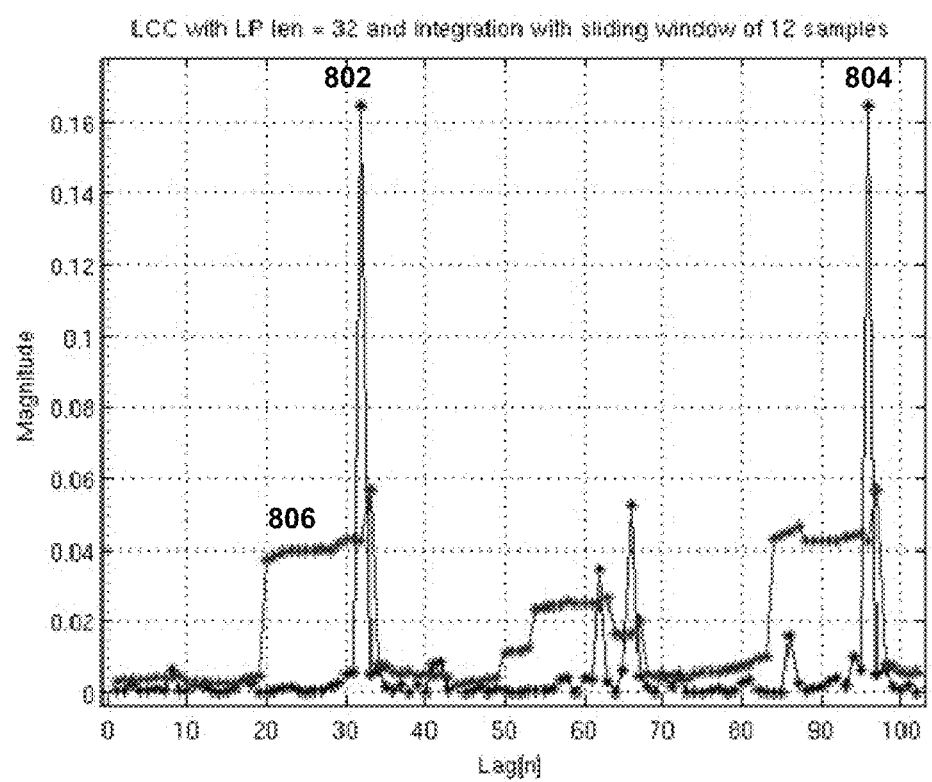
FIG. 8 shows an integration result over a LOS channel using the window of FIG. 7(a)

FIG. 8 shows an integration result 806 over a LOS channel using the window of FIG. 7(a). Peaks 802 and 804 are the two LP replicas (present in the packet preamble) of a LOS path. The integration result is similar to the integration window shape. Selecting the maximal integration value leads to the same result as if a maximal LP-LCC value would have been selected.

Figure 9:
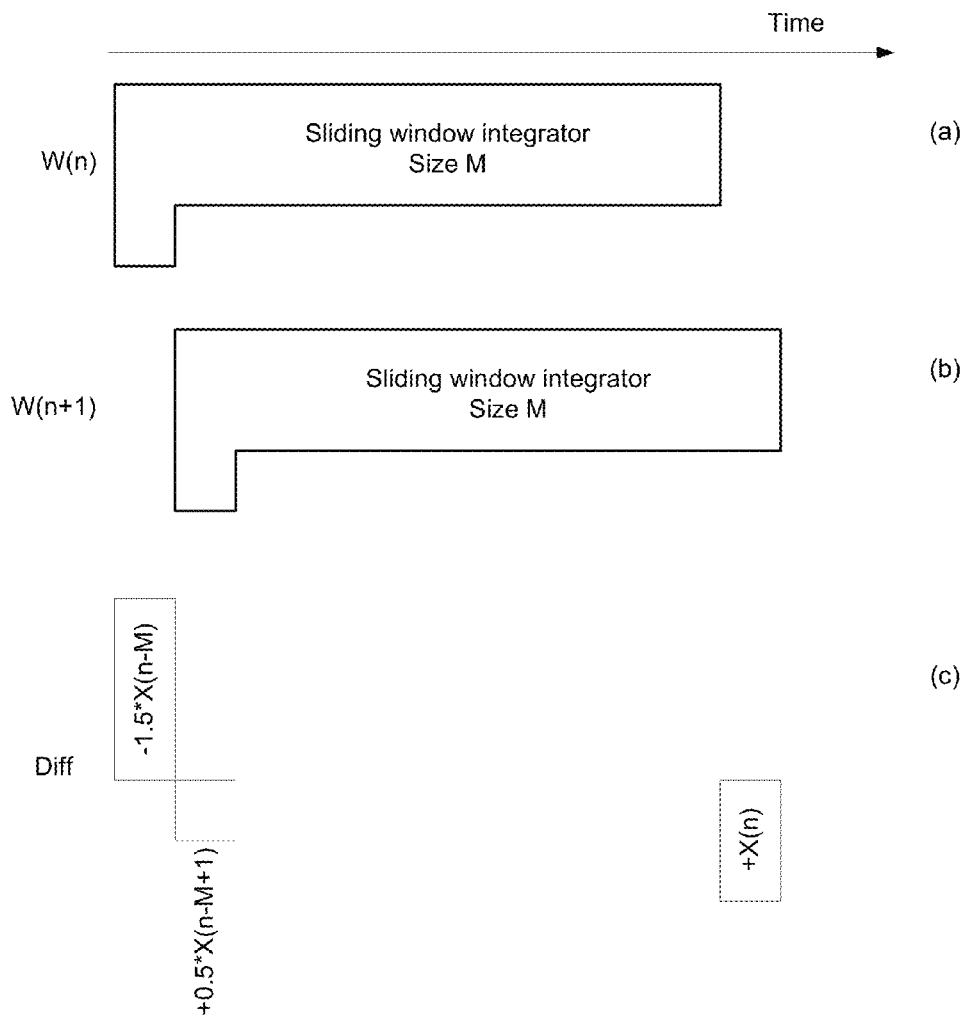
FIG. 9 illustrates the timeline of the sliding integrator.

FIG. 9 illustrates the timeline of the sliding integrator. The integrated LP-LCC result in cycle n is shown in (a), the integration in cycle n+1 is shown in (b) and the overlap between samples is shown in (c). The overlap is calculated by a simple subtraction of the integration in cycle n from the integration in cycle n+1. The overlap result is utilized in the sliding integrator implementation.

An exemplary implementation of the sliding integrator avoids full integration of the entire window in or for each sample, and instead adds 0.5 of the value X(n) and 0.5 of the value X(n−M+1) and subtracts 1.5 of the value X(n−M), where M is the integration length, following the equation:

$$AvgLcc(k) = \sum_{n=1}^{12} Lcc(n)^2 \cdot Window(k-n)$$

$$Window(n) = [one(1, 11) 1.5];$$

In this case, M=12. This value was selected since it is expected that most of the energy of a channel will be in the first 12 taps. Note that the choice of 1.5 for X(n−M) is exemplary. In other embodiments, the value can range between 1.25 and 2. Note that X(n) and X(n−M+1) can similarly have other values.

Exemplary Search for the Maximal Channel Energy Value

Figure 10:
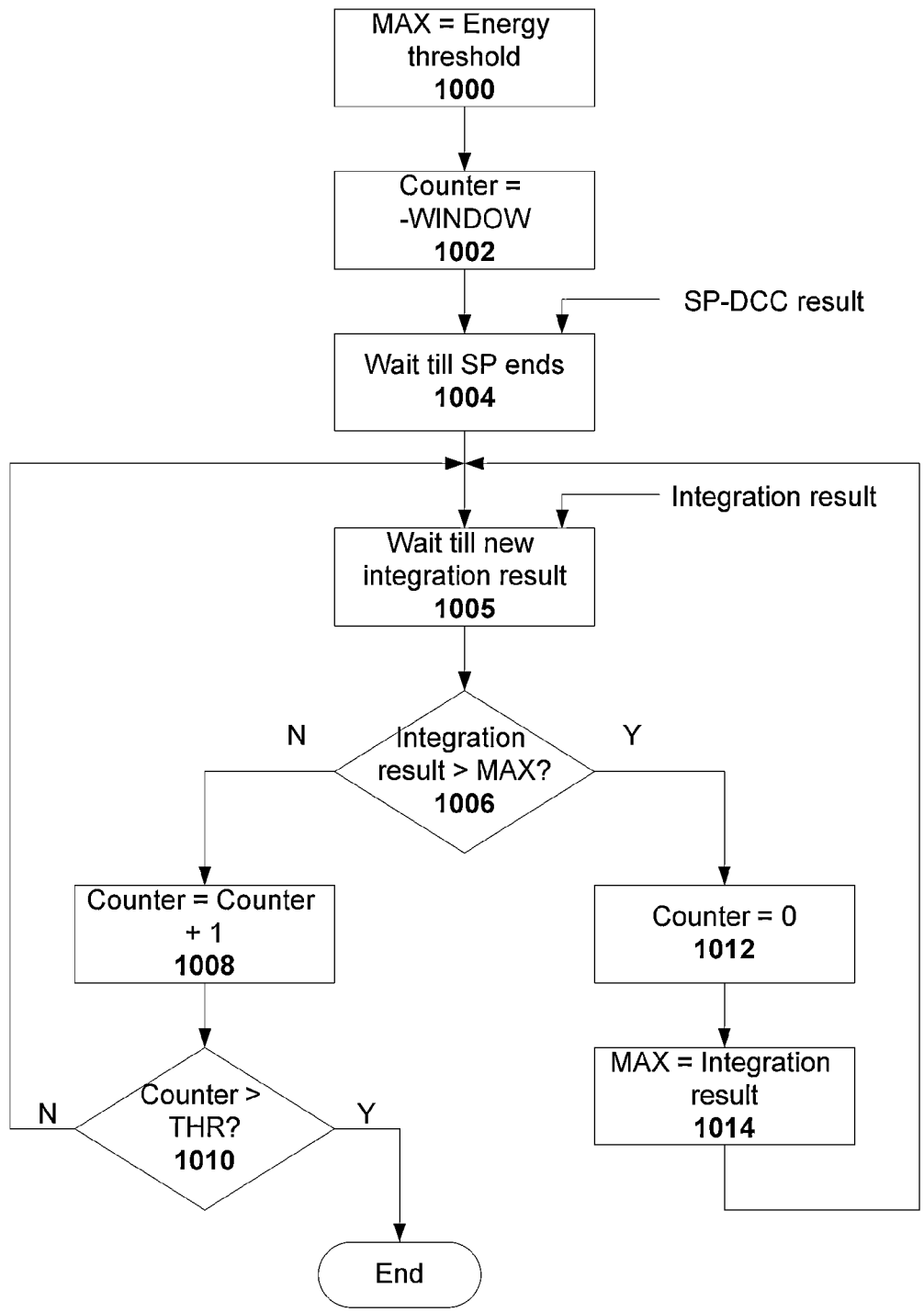
FIG. 10 shows the steps taken by a state machine (not shown) in the maximum search module of the system embodiment in FIG. 5.

An additional input from the SP-DCC module (used in step 1004 below) may be optionally used to create a robust delimiter for peak searching that reduces the LP detection false alarms when the signal is immersed in a high noise level. FIG. 10 shows the steps taken by a state machine in the maximum search module to search for the maximal channel energy. The concept of the search is based on looking for a maximum beyond a certain minimal energy, and stopping after no new maximum was found in the following (subsequent) samples, the number of which samples is marked by THR. Typically, THR would be in the range 10-15. The reason for this scheme is to ignore local maxima and to lock on the highest value, which should be separated enough from other peaks. Operation begins in step 1000, when a MAX value is assigned as an energy threshold. The measured energy must be higher than the energy threshold in order to be eligible for boundary detection. In step 1002, a counter is assigned to the value of −WINDOW, where WINDOW is the maximal search period (i.e. LP/2). In step 1004, operation is halted until SP ends, as indicated by a low DCC result. In step 1006, the integration result from the sliding integrator is compared with the MAX value. If smaller than MAX, operation continues from step 1008 and the counter is incremented by 1. In step 1010, the counter is checked if larger than THR. If Yes, the operation ends, with a maximum found. If No, operation resumes from step 1006. If in step 1006 the integration result is larger than MAX, then operation continues to step 1012. The counter is set to 0, for requiring at least THR cycles in which no new maximum is detected to end the search procedure. In other words, the integration result of the next THR cycles should be smaller than MAX for declaring the current maximum (MAX) as a global maximum and for ending the search. In step 1014, MAX is assigned to the integration result. Operation then resumes from step 1006.

Buffer 508 supports the equalization process which follows the frame boundary detection. In a typical existing WLAN implementation FFT is performed twice on the two LP replicas, and the two FFT results are averaged. Since in embodiments disclosed herein the frame boundary decision is delayed by the amount of time required to find the maximal channel energy, FFT is performed only once over the two LP replicas, after these two replicas are averaged in the time domain. This is possible since FFT is a linear function.

Figure 11:
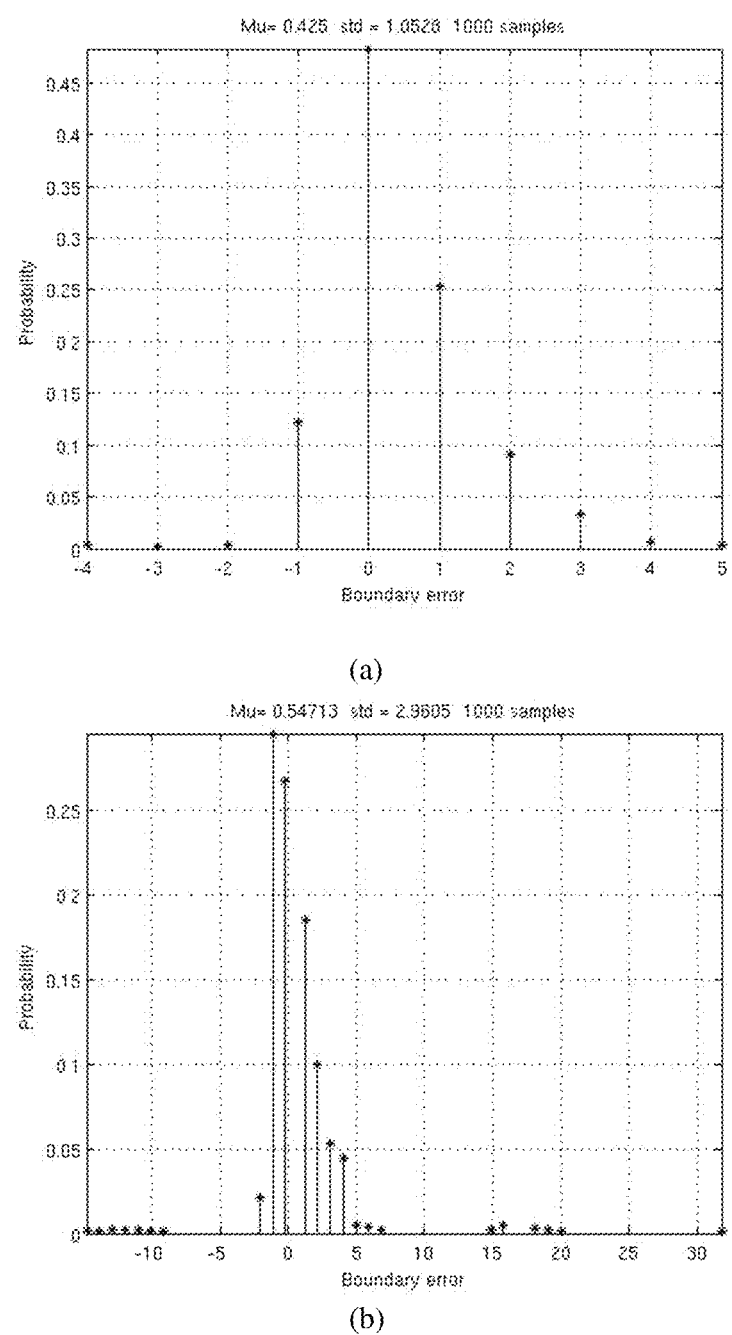
FIG. 11 shows, for a NLOS channel, a comparison between the performances of: (a) an embodiment of a method disclosed herein, and (b) the SC method.

FIG. 11 shows, for a NLOS channel, a comparison between the performances of: (a) an embodiment of a method disclosed herein and (b) the SC method. The performance difference is evident. In (a), the standard deviation in the error is three times smaller than in (b). At least two "gain contributor" factors lead to the improved performance: the first is the use of LP-LCC instead of SP-DCC for packet start. When the channel is noisy and has long delay, the detection of a SP endpoint by the decline of a DCC value often selects the wrong SP endpoint. The second factor is the pick of the strongest instead of the first path.

Figure 12:
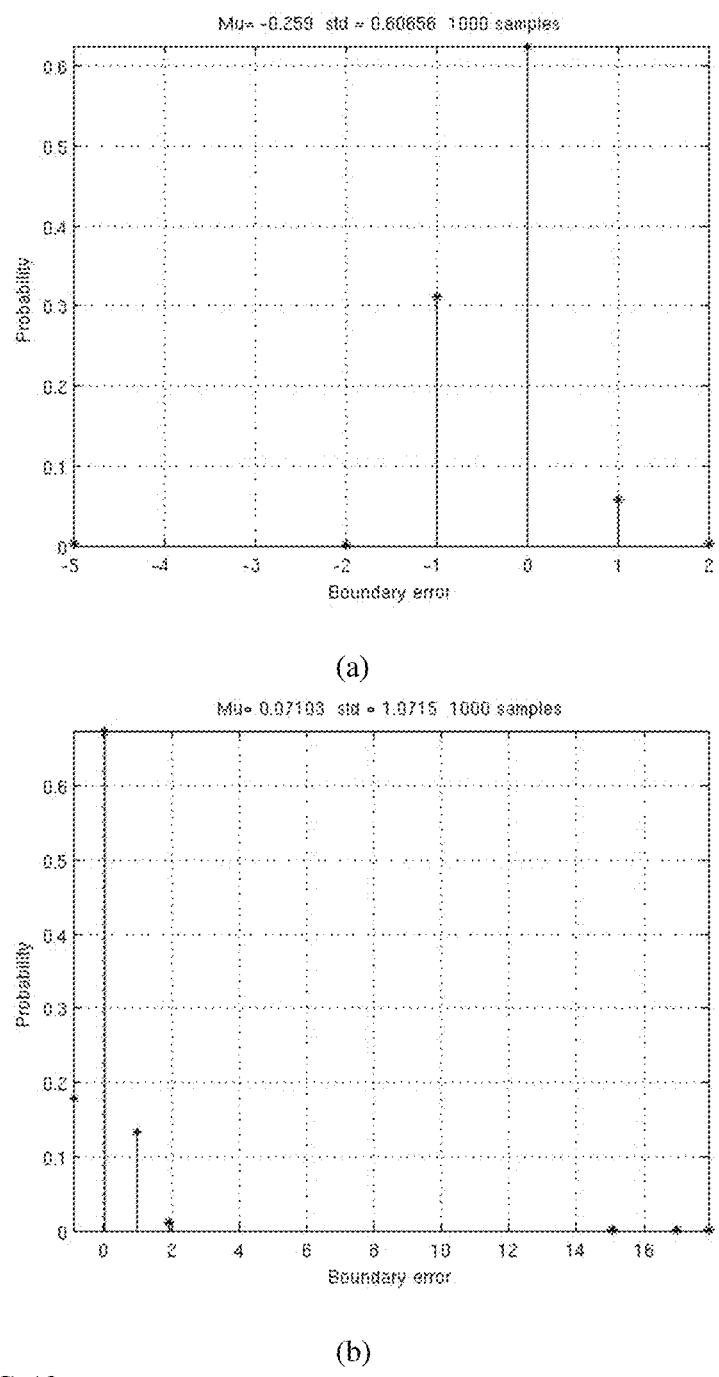
FIG. 12 shows, for a LOS channel, a comparison between the performances of: (a) an embodiment of a method disclosed herein, and (b) the SC method.

FIG. 12 shows, for a LOS channel, a comparison between the performances of: (a) an embodiment of a method disclosed herein, and (b) the SC method. The standard deviation in (a) is 40% lower than that obtained with the SC method (b), due to the first gain contributor factors mentioned above. Thus, the performance is superior even for a LOS scenario.

While this disclosure has been described in terms of certain embodiments and generally associated methods, alterations and permutations of the embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

The invention claimed is:

1. A method for OFDM flame boundary detection in a vehicular multipath channel in which a sample including a plurality of OFDM data inputs is received by a receiver in a sampling period, the method comprising the steps of:
   (a) for each sample of a plurality of samples, applying long preamble local copy correlation (LP-LCC) to the sample data inputs to yield LP-LCC results, each LP-LCC result representing energy of a single path;
   (b) integrating the LP-LCC results to obtain a respective channel energy;
   (c) finding a maximal channel energy among the channel energies; and
   (d) using the maximal channel energy to detect a frame boundary;

further comprising the step of performing a short preamble (SP) delayed cross correlation (DCC) on the sample data inputs to validate a respective LP-LCC result.

2. The method of claim 1, wherein the detection of the frame boundary is done within half a LP period.

3. The method of claim 1, wherein the integration is performed by a sliding integrator.

4. The method of claim 3, wherein the sliding integrator includes a non-flat integrating window.

5. The method of claim 1, wherein the SP-DCC is performed substantially in parallel with the LP-LCC.

6. The method of claim 1, further comprising the step of equalizing the multipath channel in a time domain using averaged LP replicas.

7. A method for OFDM frame boundary detection in a vehicular multipath channel comprising the steps of:
(a) acquiring a plurality of OFDM signal samples, each sample including a plurality of OFDM data inputs;
(b) processing each sample to obtain a respective channel energy;
(c) finding a maximal channel energy among the channel energies; and
(d) using the maximal channel energy to detect a frame boundary;
further comprising the step of performing a short preamble (SP) delayed cross correlation (DCC) on the sample data inputs to validate a respective LP-LCC result.

8. The method of claim 7, wherein steps (a)-(d) are done for a period shorter than or equal to half a LP period.

9. The method of claim 7, wherein the step of processing includes performing a long preamble local copy correlation (LP-LCC) on the data inputs of the sample to obtain a LP-LCC result and integrating all path energies as calculated by the LP-LCC, using a sliding integrator.

10. The method of claim 9, wherein the sliding integrator includes a non-flat integrating window.

11. The method of claim 7, further comprising the step of equalizing the multipath channel in a time domain using averaged LP replicas.

12. A method for OFDM frame boundary detection in a vehicular multipath channel comprising the steps of:
(a) obtaining a plurality of channel energies associated with respective OFDM data inputs, each channel energy including energies of all paths of the multipath; and
(b) detecting a frame boundary based on a maximal channel energy found among the plurality of channel energies; wherein the step of obtaining includes, for each channel energy, performing a long preamble local copy correlation (LP-LCC) on the respective OFDM data inputs to obtain a plurality of LP-LCC results and integrating the plurality of LP-LCC results to obtain the channel energy;
further comprising the step of performing a short preamble (SP) delayed cross correlation (DCC) on respective OFDM inputs to validate a respective LP-LCC result.

13. The method of claim 12, wherein the steps of obtaining and detecting are performed in a time period no greater than half a long preamble (LP) period.

14. The method of claim 12, wherein the integrating is performed by a sliding integrator.

15. The method of claim 14, wherein the sliding integrator includes a non-flat integrating window.

16. The method of claim 12, further comprising the step of equalizing the multipath channel in a time domain using averaged LP replicas.

* * * * *